United States Patent [19]
Ichimura et al.

[11] Patent Number: 6,166,096
[45] Date of Patent: Dec. 26, 2000

[54] PRE-EXPANDED PARTICLES OF POLYPROPYLENE RESIN, PROCESS FOR PRODUCING THE SAME AND PROCESS FOR PRODUCING IN-MOLD FOAMED ARTICLES THEREFROM

[75] Inventors: Tadayuki Ichimura; Kyoichi Nakamura; Kenichi Senda, all of Settsu, Japan

[73] Assignee: Kaneka Corporation, Osaka, Japan

[21] Appl. No.: 09/573,339

[22] Filed: May 18, 2000

[30] Foreign Application Priority Data

May 20, 1999 [JP] Japan ................................. 11-140405

[51] Int. Cl.⁷ ................................. C08J 9/232; C08J 9/22

[52] U.S. Cl. ................................. 521/59; 521/58; 521/134

[58] Field of Search ................................. 521/59, 58, 134

[56] References Cited

U.S. PATENT DOCUMENTS

| | | | |
|---|---|---|---|
| 5,942,551 | 8/1999 | Ichimura | 521/58 |
| 6,034,144 | 3/2000 | Shioya et al. | 521/59 |
| 6,040,348 | 3/2000 | Delaite et al. | 54/59 |
| 6,077,875 | 6/2000 | Sasaki et al. | 521/60 |

*Primary Examiner*—Morton Foelak
*Attorney, Agent, or Firm*—Armstrong, Westerman, Hattori, McLeland & Naughton

[57] ABSTRACT

A pre-expanded particle made of a blend of 10 to 90% by weight of a polypropylene resin having a melt index of 6 to 10 g/10 minutes and 90 to 10% by weight of a polypropylene resin having a melt index of 0.5 to 3 g/10 minutes. The melt index of the blend being within the range of 2 to 5 g/10 minutes. The pre-expanded particles can be molded by an in-mold foaming method in a short time without causing sink to give polypropylene resin cellular molded articles having good surface property and good melt adhesion of the particles.

4 Claims, No Drawings

PRE-EXPANDED PARTICLES OF POLYPROPYLENE RESIN, PROCESS FOR PRODUCING THE SAME AND PROCESS FOR PRODUCING IN-MOLD FOAMED ARTICLES THEREFROM

BACKGROUND OF THE INVENTION

The present invention relates to pre-expanded particles of a polypropylene resin suitable for the production of thermal insulation materials, cushioning packaging materials, returnable delivery boxes, automobile bumper cores and so on, a process for producing the pre-expanded particles, and a process for producing in-mold foamed articles from the pre-expanded particles.

In-mold foaming products obtained from polypropylene resin pre-expanded particles are superior in chemical resistance, heat resistance and distortion restoration rate after compression as compared to in-mold foaming products of polystyrene resin pre-expanded particles, and are also superior in dimensional accuracy, heat resistance and compression strength as compared to in-mold foaming products of polyethylene resin pre-expanded particles. For the reasons, polypropylene resin in-mold foaming products are widely used as automobile bumper cores, various packaging materials and others.

A propylene-$\alpha$-olefin random copolymer (typically propylene-ethylene random copolymer) having a melt flow index (melt index: hereinafter referred to as "MI") of 0.1 to 25 g/10 minutes and an $\alpha$-olefin content of not less than 1% by weight has been popularly used as a base resin of polypropylene resin pre-expanded particles for preparing foamed articles as mentioned above due to restriction in foaming properties and in-mold foaming by steam (for example, as disclosed in Japanese Patent Publication Kokoku No. 59-43492 and No. 2-50495). However, strictly speaking, in-mold foamed articles made from polypropylene resin pre-expanded particles are not so good in dimensional accuracy. They have a problem that the shrinkage in the direction of thickness is larger than that in the longitudinal direction depending on the shape of molded articles, so the so-called sink that the central portion of molded articles becomes thin generates to impair the appearance.

Also, in recent years, integration of grades of polypropylene resins has been actively made between manufacturers of polypropylene resins. Under these circumstances, it is difficult to freely select characteristics of polypropylene resins, such as MI, melting point and comonomer content, which are important for carrying out the in-mold foaming of polypropylene resin pre-expanded particles. In case of using such general purpose grade polypropylene resins in the in-mold foaming of pre-expanded particles, there arise problems that sink generates in the products and the molding time of in-mold foaming becomes long.

It is an object of the present invention to provide polypropylene resin pre-expanded particles which can be molded in a mold in a short molding time with good melt adhesion of the particles and without generation of sink to give cellular molded articles having good surface property and good dimensional accuracy.

A further object of the present invention is to provide a process for producing polypropylene resin pre-expanded particles which can be molded in a mold in a short molding time with good melt adhesion of the particles and without generation of sink to give cellular molded articles having good surface property and good dimensional accuracy.

Another object of the present invention is to provide a process for producing polypropylene resin in-mold foamed articles having good surface property and good dimensional accuracy in a short molding time with good melt adhesion of the particles and without generation of sink.

These and other objects of the present invention will become apparent from the description hereinafter.

SUMMARY OF THE INVENTION

It has now been found that pre-expanded particles prepared from a blend of 10 to 90% by weight of a polypropylene resin having an MI of 6 to 10 g/10 minutes and 90 to 10% by weight of a polypropylene resin having an MI of 0.5 to 3 g/10 minutes, the MI of the blend being within the range of 2 to 5 g/10 minutes, can be molded by an in-mold foaming method in a short molding time to give polypropylene resin cellular molded articles having good surface property and good dimensional accuracy.

In accordance with the present invention, there is provided a pre-expanded particle made of a blend of 10 to 90% by weight of a polypropylene resin having a melt index of 6 to 10 g/10 minutes and 90 to 10% by weight of a polypropylene resin having a melt index of 0.5 to 3 g/10 minutes, the melt index of the blend being within the range of 2 to 5 g/10 minutes.

The present invention also provides a process for producing pre-expanded particles of a polypropylene resin which comprises charging particles made of a blend of 10 to 90% by weight of a polypropylene resin having a melt index of 6 to 10 g/10 minutes and 90 to 10% by weight of a polypropylene resin having a melt index of 0.5 to 3 g/10 minutes, the melt index of the blend being within the range of 2 to 5 g/10 minutes, an aqueous dispersion medium and a blowing agent into a pressure vessel to form an aqueous dispersion of the particles, impregnating the particles with the blowing agent at a temperature between "melting point of the blend $-20°$ C." and "melting point of the blend $+10°$ C.", and releasing the aqueous dispersion under a pressure which is equal to or higher than the vapor pressure of the blowing agent in the pressure vessel, from the pressure vessel into an atmosphere of a lower pressure than the inner pressure of the pressure vessel.

The pre-expanded particles of the present invention can be molded in a short molding time with good melt adhesion of the particles by in-mold foaming methods to give cellular molded articles having good surface property and good dimensional accuracy.

In accordance with an embodiment of the present invention, there is provided a process for producing polypropylene resin in-mold foamed articles which comprises imparting an inner pressure of at least 0.1 kg/cm$^2$·G to the pre-expanded particles defined above of the present invention, filling the particles in a mold capable of being closed but incapable of being hermetically sealed, and heating the particles by steam to fuse together.

In accordance with another embodiment of the present invention, there is provided a process for producing polypropylene resin in-mold foamed articles which comprises compressing the pre-expanded particles defined above of the present invention up to a compression rate of 20 to 50%, filling the compressed particles in a mold capable of being closed but incapable of being hermetically sealed, and heating the particles by steam to fuse together.

The melting point of the blend as used herein means the peak temperature in an endothermic curve measured by a differential scanning calorimetry (DSC) in such a manner as heating a sample of a polypropylene resin blend to 200° C. at a temperature elevation rate of 10° C./minute, maintaining at 200° C. for 10 minutes, cooling to 40° C. at a temperature dropping rate of 10° C./minute, and then heating again to 200° C. at a temperature elevation rate of 10° C./minute in accordance with JIS K7121.

DETAILED DESCRIPTION

In the present invention, a blend of 10 to 90% by weight of a polypropylene resin having a melt index of 6 to 10 g/10 minutes and 90 to 10% by weight of a polypropylene resin having a melt index of 0.5 to 3 g/10 minutes is used in the production of pre-expanded particles.

Examples of the polypropylene resin used in the present invention are, for instance, ethylene-propylene random copolymer, butene-propylene random copolymer, ethylene-butene-propylene random terpolymer, ethylene-propylene block copolymer, butene-propylene block copolymer, ethylene-butene-propylene block terpolymer, and other known propylene copolymers and terpolymers. Particularly preferable are ethylene-propylene random copolymers and ethylene-propylene-butene random terpolymers.

The blend of the polypropylene resins is required to have an MI of 2 to 5 g/10 minutes, preferably 3 to 5 g/10 minutes. The polypropylene resin blend having a desired MI is obtained by previously blending a polypropylene resin having a melt index of 6 to 10 g/10 minutes and a polypropylene resin having a melt index of 0.5 to 3 g/10 minutes in a ratio as determined by the following equation in a mixing machine such as a tumbler, and then melt-kneading the resulting mixture by an extruder or the like:

$$\log C = X \log A + Y \log B$$

wherein A is the MI value of a polypropylene resin having a melt index of 6 to 10 g/10 minutes, B is the MI value of a polypropylene resin having a melt index of 0.5 to 3 g/10 minutes, C is the MI value of the blend, X is the weight proportion of the polypropylene resin having a melt index of 6 to 10 g/10 minutes, and Y is the weight proportion of the polypropylene resin having a melt index of 0.5 to 3 g/10 minutes, provided that "X+Y" is 1. If the MI value of the polypropylene resin blend is less than 2 g/10 minutes, the foaming property of the blend is bad and, moreover, the cell diameter of the obtained pre-expanded particles becomes very small, so the surface property and melt adhesion rate of molded articles obtained from the pre-expanded particles are lowered. If the MI value is more than 5 g/10 minutes, the foaming property is raised, but the molded articles are easy to generate sink and a longer time is required in molding.

The polypropylene resins are preferred to be in a non-crosslinked state, but they may be crosslinked by a peroxide or radiation.

The polypropylene resin blend may be used in combination with other thermoplastic resins admixable therewith so long as the properties of the polypropylene resins are not lost. Such other thermoplastic resins include, for instance, low density polyethylene, linear low density polyethylene, polystyrene, polybutene and ionomer. For example, when the polypropylene resin blend is used in combination with other polyolefins such as low density polyethylene, linear low density polyethylene, polybutene and ionomer, these other polyolefins are used in an amount of at most 20 parts by weight, preferably 5 to 20 parts by weight, per 100 parts by weight of the polypropylene resin blend. A polystyrene is used in an amount of at most 10 parts by weight, preferably 5 to 10 parts by weight, per 100 parts by weight of the polypropylene resin blend.

The polypropylene resin blend is usually processed into a desired particulate shape so as to make it easier to use in pre-expansion, for example, by melting the blend in extruder, kneader, Banbury mixer or roll mill, and forming into particles having a desired shape, such as column, prolate spheroid, sphere, cube or rectangular parallelopiped, and having an average particle size of 0.1 to 5 mm, preferably 0.5 to 3 mm.

The polypropylene resin pre-expanded particles of the present invention are produced by introducing particles of the polypropylene resin blend, an aqueous dispersion medium, preferably water, and a blowing agent into a pressure vessel to form an aqueous dispersion of the particles, impregnating the particles with the blowing agent at an elevated temperature in the pressure vessel, optionally heating the aqueous dispersion under pressure to a prescribed expansion temperature, and releasing the aqueous dispersion under pressure from the pressure vessel into a lower pressure zone to thereby expand the particles.

The impregnation of the particles with a blowing agent is carried out at a temperature higher than the temperature at which the polypropylene resin blend is softened. In general, the impregnation is carried out by elevating the temperature of the aqueous dispersion in the pressure vessel to a prescribed expansion temperature at which the aqueous dispersion of the impregnated particles is discharged into a lower pressure zone. After finally elevating the temperature of the aqueous dispersion to the expansion temperature as occasion demands, the aqueous dispersion is released from the vessel to expand the particles.

The expansion temperature is selected within the range of "melting point of a polypropylene resin blend −20° C." to "melting point of a polypropylene resin blend +10° C." according to the kind of polypropylene resins used, the amount of a blowing agent used, a desired expansion ratio of pre-expanded particles to be produced, and the like.

Examples of the blowing agent to be impregnated into the polypropylene resin particles are, for instance, an aliphatic hydrocarbon such as propane, butane, pentane or hexane; an alicyclic hydrocarbon such as cyclopentane or cyclobutane; a halogenated hydrocarbon such as trichlorotrifluoromethane, dichlorodifluoromethane, dichlorotetrafluoroethane, trichlorotrifluoroethane, methyl chloride, methylene chloride or ethyl chloride, and an inorganic gas such as air, nitrogen or carbon dioxide. The blowing agents may be used alone or in admixture thereof. The amount of the blowing agent used is not limited, and is suitably selected depending on a desired degree of expansion of the polypropylene pre-expanded particles to be produced. In general, the blowing agent is used in an amount of 5 to 60 parts by weight per 100 parts by weight of the polypropylene resin particles.

In the preparation of an aqueous dispersion of polypropylene resin particles, a dispersing agent such as calcium tertiary phosphate, basic magnesium carbonate or calcium carbonate may be used. A small amount of a surfactant such as sodium dodecylbenzenesulfonate, sodium n-paraffinsulfonate or sodium α-olefinsulfonate may also be used as a dispersing aid. The amounts of dispersing agent and surfactant vary depending on the kinds thereof and the kind and amount of the polypropylene resin particles used. In general, the amount of the dispersing agent is from 0.2 to 3 parts by weight per 100 parts by weight of the dispersion medium, typically water. The amount of the surfactant is from 0.001 to 0.2 part by weight per 100 parts by weight of the dispersion medium.

Preferably, the amount of the polypropylene resin particles to be dispersed into an aqueous dispersion medium, typically water, is from 20 to 100 parts by weight per 100 parts by weight of the dispersion medium, in order to achieve good dispersion of the particles into the dispersion medium.

After keeping, in a pressure vessel, the aqueous dispersion of the particles at an elevated temperature under pressure for a time sufficient to impregnate the particles with a blowing agent and finally heating the aqueous dispersion under pressure to an expansion temperature, the aqueous dispersion is released from the vessel into an atmosphere of lower pressure through an orifice having openings with a diameter of 2 to 10 mm, while keeping the inner pressure of the vessel at a pressure equal to or higher than the vapor pressure shown by the blowing agent in the vessel when starting the release by introducing an appropriate gas into the vessel, thereby pre-expanding the particles to give the polypropylene resin pre-expanded particles of the present invention.

There is no particular limitation in the pressure vessel used, and any vessels can be used so long as they can withstand the pressures and temperatures noted above. A representative vessel is an autoclave type pressure vessel.

Molding of the pre-expanded particles of the present invention can be carried out in accordance with a known in-mold foaming method as disclosed in Japanese Patent Publication Kokoku No. 51-22951 or Japanese Patent Publication Kokoku No. 6-59694, for example, by filling the polypropylene resin pre-expanded particles in a mold capable of being closed but incapable of being hermetically sealed, and heating the particles with steam or the like to fuse them together, thus giving cellular molded articles true to the mold.

It is preferable to provide the pre-expanded particles with a gas pressure prior to filling the pre-expanded particles in a mold, or to fill the pre-expanded particles in a mold in the state of being compressed at a compression rate of at least 20%, preferably 20 to 50%.

In the former case, an inner pressure based on a gas pressure can be imparted to the pre-expanded particles by holding the pre-expanded particles under pressure in an inorganic gas or the like, thereby imparting an expandability to the particles Examples of the inorganic gas are, for instance, air, nitrogen, helium, neon, argon or carbon dioxide gas. These gases may be used alone or in admixture thereof. Of these, air and nitrogen are preferable in view of versatility.

In the latter case, for example, the pre-expanded particles are compressed by a pressurized gas up to a compression rate of 20 to 50% and subsequently filled in a mold in the compressed state. The compression rate of polypropylene resin pre-expanded particles is a value obtained by dividing the weight of pre-expanded particles when filled under atmospheric pressure in a mold of a molding machine by the weight of the pre-expanded particles when filled in the compressed state in the mold, and is represented by the equation:

$$\text{Compression rate} = \left(1 - \frac{\text{Weight of pre-expanded particles when filled under atmosperic pressure}}{\text{Weight of pre-expanded particles when filled in the compressed state}}\right) \times 100$$

The melt index (MI) as used herein denotes a value measured by using an MFR (melt flow rate) measuring apparatus described in JIS K7210 under conditions of orifice diameter 2.0959±0.005 mm, orifice length 8.000±0.025 mm, load 2,160 g and temperature 230±0.2° C. The MI values shown in the following examples are found values.

The present invention is more specifically explained by means of examples and comparative examples, in which all parts are by weight unless otherwise noted. It is to be understood that the present invention is not limited to only these examples.

In the examples and comparative examples, measurement of properties was made according to the following methods.

1. Cooling Time

After the steam heating was finished in molding pre-expanded particles in a mold, the time (seconds) required for the pressure of the molded article surface against the mold surface (namely molded article surface pressure) to decrease to 0.3 kg/cm$^2$·G was measured.

2. Melt Adhesion Rate of Particles

After forming a notch with a knife in the surface of a molded article to a depth of about 5 mm, the molded article was split along the line of the notch by bending the molded article. The broken surface was observed and the percentage of broken particles to the whole particles was obtained. Evaluation was made according to the following criteria. A melt adhesion rate of at least 60% is usually satisfactory for molded articles.

○: Melt adhesion rate of at least 60%

Δ: Melt adhesion rate of 50% to less than 60%

X: Melt adhesion rate of less than 50%

3. Surface Appearance

The surface of a molded article was visually observed and evaluated according to the following criteria.

○: There is no irregularity in the surface and there is little gap between particles.

Δ: There is no irregularity in the surface, but there are conspicuous gaps between particles.

X: There is an irregularity in the surface, and gaps between respective particles are very large.

4. Deformation

The thickness of each of the center portion and the edge portion of a molded article was measured. The difference between the thickness values was regarded as deformation (sink) and evaluated according to the following criteria.

○: Difference of less than 0.5 mm

Δ: Difference of 0.5 to less than 1.5 mm

X: Difference of 1.5 mm or more

The polypropylene resins shown in Table 1 were used in the following examples and comparative examples.

TABLE 1

|  | Polypropylene resin | Ethylene content (wt. %) | Butene content (wt. %) | DSC melting point (° C.) | MI (g/10 min.) | Molecular weight distribution (Mw/Mn) |
|---|---|---|---|---|---|---|
| A | Ethylene-propylene random copolymer | 3.2 | 0 | 145.0 | 7.0 | 5.0 |
| B | Ethylene-butene-propylene random copolymer | 1.2 | 4.8 | 146.0 | 7.0 | 4.6 |
| C | Ethylene-propylene random copolymer | 3.5 | 0 | 144.0 | 0.5 | 4.3 |
| D | Ethylene-propylene random copolymer | 3.0 | 0 | 146.0 | 6.0 | 3.7 |
| E | Ethylene-propylene random copolymer | 3.0 | 0 | 145.0 | 1.5 | 3.5 |

EXAMPLES 1 TO 5

Comparative Examples 1 to 5

Polypropylene resins mixed in the ratio shown in Table 2 were melt-kneaded by an extruder to give resin particles having a weight of 1.8 mg/particle. The MI of the resin particles was measured according to JIS K7210.

A pressure vessel was charged with 100 parts of the obtained resin particles, 13 parts of isobutane, 300 parts of water and, as a dispersing agent, 2.0 parts of powdery basic calcium tertiary phosphate and 0.03 part of sodium n-paraffinsulfonate. The resulting aqueous dispersion was heated and maintained at the expansion temperature shown in Table 2. The pressure inside the vessel at that time was about 15.0 kg/cm$^2$G.

Subsequently the pressure inside the vessel was adjusted to the expansion pressure shown in Table 2 by introducing isobutane to the vessel. A valve provided at a lower part of the pressure vessel was then opened, while maintaining the pressure inside the vessel at that pressure, to release the aqueous dispersion into atmospheric pressure through an orifice plate having openings of 4.0 mm in diameter, thereby performing expansion of the resin particles. The thus obtained pre-expanded particles had an expansion ratio of 15 to 16 and a bulk density shown in Table 2.

The pre-expanded particles were placed in a pressure vessel and compressed by air pressure, and the compressed particles were filled in a block mold having a size of 320×320×60 mm at a compression rate of 40%. Air in the mold was then expelled by steam of 1.0 kg/cm$^2$G, and in-mold foaming was carried out by heating the particles with steam of 3.1 to 3.5 kg/cm$^2$G to give a molded article. After aging the molded article at 75° C. for 7 hours and allowing to stand at room temperature for a day, the molded article was evaluated.

The results are shown in Table 2.

The molded articles prepared in the examples from a polypropylene resin blend having an MI of 2.5, 4.1 or 4.4 g/10 minutes as a raw material have good properties that the deformation, melt adhesion and surface properties are good and the cooling time is short. In contrast, the molded articles prepared in the comparative examples from a polypropylene resin blend having an MI of 6.0 or 7.0 g/10 minutes as a raw material show a large deformation and require a long cooling time. Also, the molded article prepared in the comparative example from a polypropylene resin blend having an MI of 0.5 g/10 minutes as a raw material is inferior in surface property and melt adhesion property and shows a slight deformation. The molded article prepared in the comparative example from a polypropylene resin blend having an MI of 1.5 g/10 minutes as a raw material is inferior in surface property and melt adhesion property, although the cooling time is short.

TABLE 2

|  | Raw material resin blend | | Pre-expanded particles | | | In-mold foamed articles | | | | | |
|---|---|---|---|---|---|---|---|---|---|---|---|
|  | Mixing ratio (by wt.) | MI of blend (g/10 min.) | Expansion temperature (° C.) | Expansion pressure (kg/cm$^2$ · G) | Bulk density (g/liter) | Molding pressure (kg/cm$^2$ · G) | Density of molded article (g/liter) | Deformation | Melt adhesion | Surface property | Cooling time (sec.) |
| Ex. 1 | A/C = 80/20 | 4.1 | 140.0 | 17.5 | 36.0 | 3.2 | 60 | ○ | ○ | ○ | 50 |
| Ex. 2 | B/C = 80/20 | 4.1 | 140.0 | 17.5 | 36.5 | 3.2 | 61 | ○ | ○ | ○ | 60 |
| Ex. 3 | A/C = 50/50 | 2.5 | 139.5 | 17.8 | 36.5 | 3.2 | 60 | ○ | ○ | ○ | 70 |
| Ex. 4 | D/C = 80/20 | 2.5 | 139.0 | 18.0 | 36.0 | 3.2 | 60 | ○ | ○ | ○ | 70 |
| Ex. 5 | A/E = 70/30 | 4.4 | 139.5 | 17.3 | 36.5 | 3.1 | 60 | ○ | ○ | ○ | 80 |
| Com. Ex. 1 | A = 100 | 7.0 | 141.0 | 17.0 | 37.0 | 3.2 | 59 | x | ○ | ○ | 90 |
| Com. Ex. 2 | B = 100 | 7.0 | 140.0 | 17.0 | 36.0 | 3.2 | 60 | x | ○ | ○ | 120 |
| Com. Ex. 3 | C = 100 | 0.5 | 138.0 | 19.0 | 36.0 | 3.5 | 60 | Δ | Δ | x | 30 |
| Com. Ex. 4 | D = 100 | 6.0 | 138.0 | 17.0 | 36.0 | 3.2 | 61 | x | ○ | ○ | 150 |
| Com. Ex. 5 | E = 100 | 1.5 | 139.0 | 18.0 | 36.0 | 3.5 | 61 | Δ | Δ | Δ | 60 |

EXAMPLES 6 TO 10

Comparative Examples 6 to 10

The pre-expanded particles obtained in each of Examples 1 to 5 and Comparative Examples 1 to 5 were placed in a pressure vessel, and held at 25° C. under an air pressure of 2.0 kg/cm$^2$G for 15 hours to adjust the inner pressure of the particles to 0.6 kg/cm$^2$G. The particles were then filled in a block mold having a size of 320×320×60 mm. Air in the mold was expelled by steam of 1.0 kg/cm²G, and in-mold foaming was carried out by heating the particles with steam of 3.1 to 3.5 kg/cm²G to give a molded article. After aging the molded article at 75° C. for 7 hours and allowing to stand at room temperature for a day, the molded article was evaluated.

The results are shown in Table 3.

The molded articles prepared in the examples from a polypropylene resin blend having an MI of 2.5, 4.1 or 4.4 g/10 minutes as a raw material have good properties that the deformation, melt adhesion and surface properties are good and the cooling time is short. In contrast, the molded articles prepared in the comparative examples from a polypropylene resin blend having an MI of 6.0 or 7.0 g/10 minutes as a raw material show a large deformation and require a long cooling time. Also, the molded article prepared in the comparative example from a polypropylene resin blend having an MI of 0.5 g/10 minutes as a raw material is inferior in surface property and melt adhesion property and shows a slight deformation. The molded article prepared in the comparative example from a polypropylene resin blend having an MI of 1.5 g/10 minutes as a raw material is inferior in surface property and melt adhesion property, although the cooling time is short.

minutes, the melt index of said blend being within the range of 2 to 5 g/10 minutes.

2. A process for producing pre-expanded particles of a polypropylene resin which comprises charging particles made of a blend of 10 to 90% by weight of a polypropylene resin having a melt index of 6 to 10 g/10 minutes and 90 to 10% by weight of a polypropylene resin having a melt index of 0.5 to 3 g/10 minutes, the melt index of said blend being within the range of 2 to 5 g/10 minutes, an aqueous dispersion medium and a blowing agent into a pressure vessel to form an aqueous dispersion of the particles, impregnating said particles with said blowing agent at a temperature between "melting point of the blend −20° C." and "melting point of the blend +10° C.", and releasing said aqueous dispersion under a pressure which is equal to or higher than the vapor pressure of said blowing agent in the pressure vessel, from the pressure vessel into an atmosphere of a lower pressure than the inner pressure of the pressure vessel.

3. A process for producing polypropylene resin in-mold foamed articles which comprises imparting an inner pressure

TABLE 3

| | Raw material resin blend | | Pre-expanded particles | | | In-mold foamed articles | | | | | |
|---|---|---|---|---|---|---|---|---|---|---|---|
| | Mixing ratio (by wt.) | MI of blend (g/10 min.) | Expansion temperature (° C.) | Expansion pressure (kg/cm² · G) | Bulk density (g/liter) | Molding pressure (kg/cm² · G) | Density of molded article (g/liter) | Deformation | Melt adhesion | Surface property | Cooling time (sec.) |
| Ex. 6 | A/C = 80/20 | 4.1 | 140.0 | 17.5 | 36.0 | 3.2 | 44 | ○ | ○ | ○ | 70 |
| Ex. 7 | B/C = 80/20 | 4.1 | 140.0 | 17.5 | 36.5 | 3.2 | 45 | ○ | ○ | ○ | 80 |
| Ex. 8 | A/C = 50/50 | 2.5 | 139.5 | 17.8 | 36.5 | 3.2 | 45 | ○ | ○ | ○ | 90 |
| Ex. 9 | D/C = 80/20 | 2.5 | 139.0 | 18.0 | 36.0 | 3.2 | 45 | ○ | ○ | ○ | 90 |
| Ex. 10 | A/E = 70/30 | 4.4 | 139.5 | 17.3 | 36.5 | 3.1 | 44 | ○ | ○ | ○ | 90 |
| Com. Ex. 6 | A = 100 | 7.0 | 141.0 | 17.0 | 37.0 | 3.2 | 44 | x | ○ | ○ | 120 |
| Com. Ex. 7 | B = 100 | 7.0 | 140.0 | 17.0 | 36.0 | 3.2 | 45 | x | ○ | ○ | 150 |
| Com. Ex. 8 | C = 100 | 0.5 | 138.0 | 19.0 | 36.0 | 3.5 | 44 | Δ | Δ | x | 50 |
| Com. Ex. 9 | D = 100 | 6.0 | 138.0 | 17.0 | 36.0 | 3.2 | 45 | x | ○ | ○ | 180 |
| Com. Ex. 10 | E = 100 | 1.5 | 139.0 | 18.0 | 36.0 | 3.4 | 44 | Δ | Δ | Δ | 80 |

As understood from the results shown in Tables 2 and 3, when polypropylene resin pre-expanded particles are produced from a blend of polypropylene resins having different melt indexes blended in a specific ratio to have a specific melt index, there can be obtained pre-expanded particles which can be molded in a short time to provide in-mold foamed articles having a low shrinkage and accordingly free of sink and having a good surface property.

What we claim:

1. A pre-expanded particle made of a blend of 10 to 90% by weight of a polypropylene resin having a melt index of 6 to 10 g/10 minutes and 90 to 10% by weight of a polypropylene resin having a melt index of 0.5 to 3 g/10 of at least 0.1 kg/cm²·G to the pre-expanded particles of claim 1, filling said pre-expanded particles in a mold capable of being closed but incapable of being hermetically sealed, and heating said pre-expanded particles by steam to fuse together.

4. A process for producing polypropylene resin in-mold foamed articles which comprises compressing the pre-expanded particles of claim 1 up to a compression rate of 20 to 50%, filling the compressed particles in a mold capable of being closed but incapable of being hermetically sealed, and heating said particles by steam to fuse together.

* * * * *